United States Patent
Haddad (10) Patent No.: US 8,413,243 B2
(45) Date of Patent: Apr. 2, 2013

(54) METHOD AND APPARATUS FOR USE IN A COMMUNICATIONS NETWORK

(75) Inventor: Wassim Haddad, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 304 days.

(21) Appl. No.: 12/866,641

(22) PCT Filed: Feb. 8, 2008

(86) PCT No.: PCT/SE2008/050156
§ 371 (c)(1),
(2), (4) Date: Aug. 6, 2010

(87) PCT Pub. No.: WO2009/099358
PCT Pub. Date: Aug. 13, 2009

(65) Prior Publication Data
US 2010/0325416 A1    Dec. 23, 2010

(51) Int. Cl.
*H04L 29/06*          (2006.01)
(52) U.S. Cl. .......... 726/23; 380/247; 380/272; 713/150; 713/168
(58) Field of Classification Search ................ 713/168, 713/150; 380/247, 272; 726/22, 23
See application file for complete search history.

(56) References Cited

U.S. PATENT DOCUMENTS

| | | | |
|---|---|---|---|
| 6,167,513 A * | 12/2000 | Inoue et al. ................... 713/150 |
| 7,298,743 B2 * | 11/2007 | Markki et al. ................. 370/392 |
| 7,516,486 B2 * | 4/2009 | Olivereau et al. ............... 726/13 |
| 7,561,553 B2 * | 7/2009 | Venkitaraman et al. ...... 370/338 |
| 7,564,825 B2 * | 7/2009 | Olivereau et al. ............. 370/338 |
| 7,593,377 B2 * | 9/2009 | Thubert et al. ................ 370/338 |
| 7,885,274 B2 * | 2/2011 | Thubert ......................... 370/401 |
| 7,886,076 B2 * | 2/2011 | Brabson ......................... 709/238 |
| 7,895,339 B2 * | 2/2011 | Hirano et al. .................. 709/227 |
| 7,913,082 B2 * | 3/2011 | Kim ................................ 713/162 |
| 7,933,253 B2 * | 4/2011 | Akram et al. .................. 370/338 |
| 7,953,081 B2 * | 5/2011 | Dempo et al. ................. 370/389 |
| 8,031,674 B2 * | 10/2011 | Weniger et al. ................ 370/331 |
| 8,037,302 B2 * | 10/2011 | Vaarala et al. ................. 713/160 |
| 2002/0114469 A1 | 8/2002 | Faccin et al. |
| 2002/0128008 A1 * | 9/2002 | Phan-Anh et al. ............ 455/424 |
| 2002/0152380 A1 * | 10/2002 | O'Shea et al. ................. 713/170 |
| 2003/0092425 A1 | 5/2003 | Okazaki et al. |
| 2004/0010683 A1 * | 1/2004 | Huitema ........................ 713/162 |
| 2004/0090937 A1 * | 5/2004 | Chaskar et al. ............... 370/331 |
| 2004/0148520 A1 * | 7/2004 | Talpade et al. ................ 713/201 |
| 2004/0228343 A1 * | 11/2004 | Molteni et al. ................ 370/392 |
| 2006/0050671 A1 * | 3/2006 | Kim ................................ 370/338 |
| 2006/0185012 A1 * | 8/2006 | Olivereau et al. .............. 726/14 |
| 2006/0248230 A1 * | 11/2006 | Kempf et al. .................. 709/245 |

(Continued)

FOREIGN PATENT DOCUMENTS

WO             03/046778 A2      6/2003
WO   WO 2004028053 A1 *   4/2004

*Primary Examiner* — David García Cervetti
(74) *Attorney, Agent, or Firm* — Coats & Bennett, P.L.L.C.

(57) ABSTRACT

A method is provided for use in a Mobile IP network in which it is determined whether a Mobile Node (10) in a visited network is reachable on a new claimed Care-of Address for the Mobile Node (10) using information relating to a pre-established cryptographic relationship between the Mobile Node (10) and an Access Router (20) of the visited network. It may be determined, through communication between a Home Agent (30) for the Mobile Node (10) in the Mobile Node 10's home network and the Access Router (20), whether such a pre-established cryptographic relationship exists. The existence of such a pre-established relationship would indicate that the Mobile Node (10) is reachable on the claimed Care-of Address.

27 Claims, 7 Drawing Sheets

U.S. PATENT DOCUMENTS

| | | | |
|---|---|---|---|
| 2006/0291422 A1* | 12/2006 | Rochford | 370/331 |
| 2007/0113075 A1* | 5/2007 | Jo et al. | 713/158 |
| 2007/0230410 A1* | 10/2007 | Thubert et al. | 370/338 |
| 2008/0117844 A1* | 5/2008 | Thubert et al. | 370/310 |
| 2008/0192679 A1* | 8/2008 | Dempo et al. | 370/328 |
| 2008/0198805 A1* | 8/2008 | Weniger et al. | 370/331 |
| 2008/0205313 A1* | 8/2008 | Thubert | 370/310 |
| 2008/0205653 A1* | 8/2008 | Haddad | 380/278 |
| 2008/0301434 A1* | 12/2008 | Haddad et al. | 713/153 |
| 2008/0304457 A1* | 12/2008 | Thubert et al. | 370/338 |
| 2009/0031130 A1* | 1/2009 | Hirano et al. | 713/170 |
| 2009/0257401 A1* | 10/2009 | Hirano et al. | 370/331 |
| 2009/0265453 A1* | 10/2009 | Hirano et al. | 709/223 |
| 2009/0307485 A1* | 12/2009 | Weniger et al. | 713/153 |
| 2010/0054133 A1* | 3/2010 | Schuringa et al. | 370/241 |
| 2010/0097993 A1* | 4/2010 | Hirano et al. | 370/328 |
| 2010/0189000 A1* | 7/2010 | Hirano et al. | 370/252 |
| 2010/0214982 A1* | 8/2010 | Hirano et al. | 370/328 |
| 2010/0275253 A1* | 10/2010 | Hirano et al. | 726/9 |
| 2010/0296481 A1* | 11/2010 | Weniger et al. | 370/331 |
| 2010/0313024 A1* | 12/2010 | Weniger et al. | 713/170 |
| 2010/0325416 A1* | 12/2010 | Haddad | 713/150 |
| 2011/0035585 A1* | 2/2011 | Haddad | 713/162 |
| 2011/0055551 A1* | 3/2011 | Oulai | 713/153 |
| 2011/0055572 A1* | 3/2011 | Vogt et al. | 713/171 |
| 2011/0090842 A1* | 4/2011 | Hirano et al. | 370/328 |

\* cited by examiner

METHOD AND APPARATUS FOR USE IN A COMMUNICATIONS NETWORK

TECHNICAL FIELD

The present invention relates to a method and apparatus for use in telecommunications network. In particular, the present invention relates to a method and apparatus for use in a Mobile IP network to determine whether a Mobile Node in a visited network is reachable on a new claimed Care-of Address for the Mobile Node.

BACKGROUND

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

With the revolution in telecommunications and computer industry in the early 1990's, smaller communication equipment and computers became more widely available and the invention of the World Wide Web, and all the services that emerged with it, finally made the Internet attractive for the average person. The combination of increasing usage of the network and mobile telecommunications created the need for secure mobility management in the Internet.

Taking into account the above mobility management, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", RFC3775, IETF, 2004) have been introduced. Extensions to the Mobile IPv6 standard have also been developed and standardised (e.g. see J. Arkko, C. Vogt, W. Haddad, "Enhanced Route Optimization for Mobile IPv6", IETF, RFC 4866, May 2007). Together these specifications are planned to provide mobility support for the next generation Internet.

An IP address describes a topological location of a node in the network. The IP address is used to route the packet from the source node to the destination. At the same time, the IP address is generally also used to identify the node, providing two different functions in one entity. This can be considered to be akin to a person responding with their home address when asked who they are. When mobility is also considered, the situation becomes even more complicated: since IP addresses act as host identifiers in this scheme, they must not be changed; however, since IP addresses also describe topological locations, they must necessarily change when a host changes its location in the network.

With Mobile IP, the solution is to use a fixed home location providing a "home address" for the node. The home address both identifies the node and provides a stable location for it when it is at home. The current location information is available in the form of a care-of address, which is used for routing purposes when the node is away from home.

Cellular networks provide roaming capabilities, where visited networks provide connectivity to roaming users. The traffic of roaming users may be tunnelled back to the home network or it may leave or be terminated in the visited network. Possible reasons for using home tunnelling include: the ability to charge at home; enabling policy control at home; having a mobility anchor at home; providing location privacy; and allowing for the possibility that servers providing user service are in the home network. Possible reasons for local breakout include: optimal routing; shorter (and hence cheaper) access to the Internet; and access to services provided locally in the visited network.

The following two mechanisms for providing home tunnelling and optimal routing (local breakout) dynamically while being reachable at the same IP address are known:
    IP2, where route optimization is entirely network centric.
    The Mobile IP standard, as mentioned above, where Mobile Nodes (MN) themselves send location update messages (Binding Updates, BU) to Correspondent Nodes (CN). Then Correspondent Nodes direct their traffic to the current location of the MN.

While IP2 allows full control for the network to decide routing (including home tunnelling or route optimization), it is a complex system requiring IP2 to be implemented at the visited and home networks and also in the network of the CN. Its complexity makes it unsuitable for a number of purposes.

Another form of route optimization (albeit a less powerful one) is the use of a locally-assigned IP address for communication by the MN instead of the home address. In this case, no specific mechanisms are needed to ensure direct routing between the CN and the MN; however, the transport session may break if the MN moves away. The MN may choose to initiate communication using a locally-assigned address at its own discretion.

Figure 1:
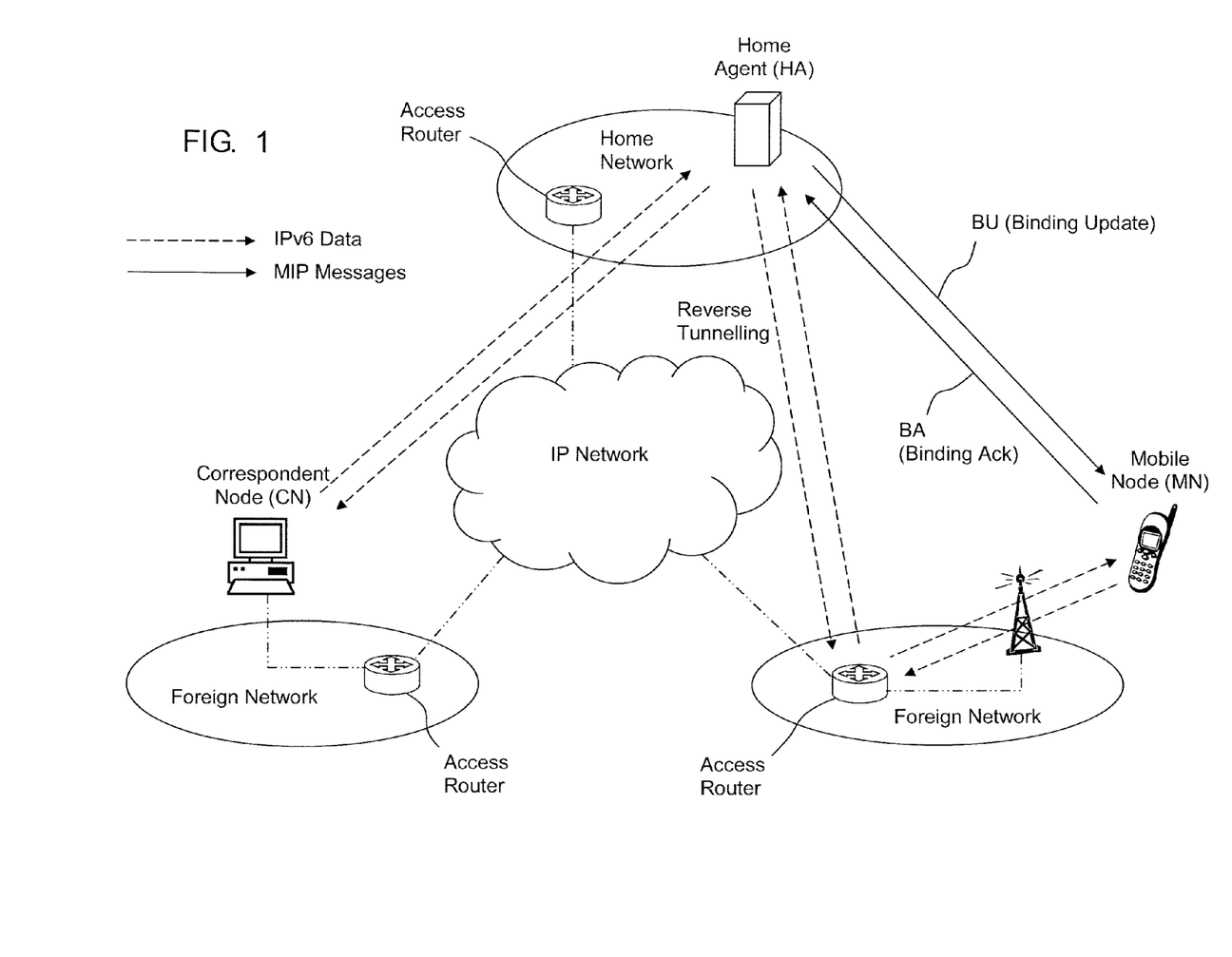
FIG. 1, discussed hereinbefore, illustrates the bidirectional tunnelling mode of Mobile IP.
Figure 2:
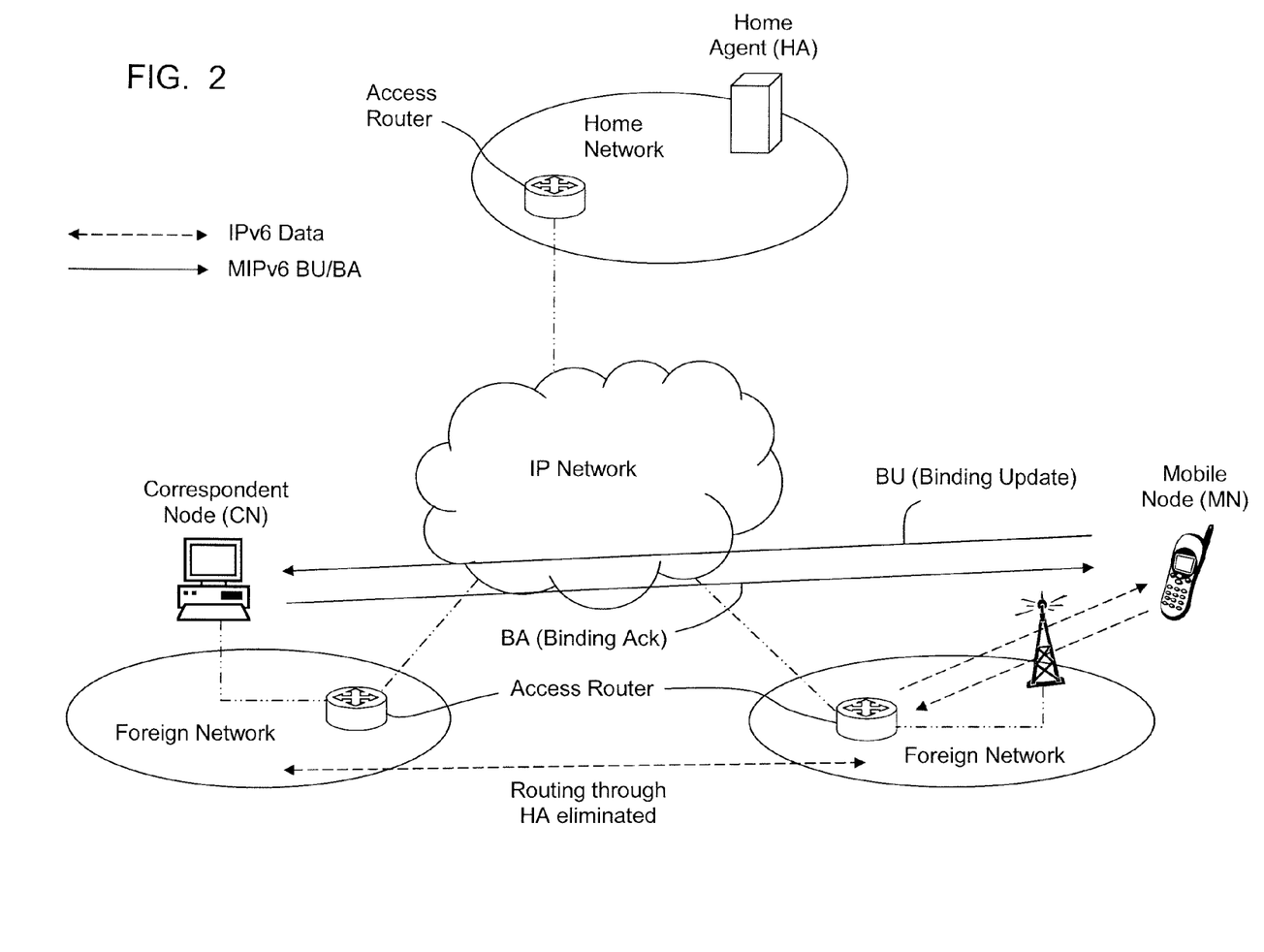
FIG. 2, also discussed hereinbefore, illustrates the route optimization mode of Mobile IP.

The Mobile IP standard will now be described in more detail with reference to FIGS. 1 and 2 of the accompanying drawings.

Mobile IP is a mechanism for maintaining transparent network connectivity to and from a Mobile Node (MN), such as a mobile terminal or telephone over an IP based network. Mobile IP enables a Mobile Node to be addressed by the IP address it uses in its home network (Home Address), regardless of the network to which it is currently physically attached. Therefore, ongoing network connections to and from a Mobile Node can be maintained even as the Mobile Node is moving from one subnet to the other. Mobile IP can be implemented using IP protocol version 4, IPv4 or IP protocol version 6, IPv6. IPv6 is generally preferred as IPv4 has a number of limitations in a mobile environment. The IPv6 protocol as such is specified in RFC 2460.

In Mobile IPv6, each Mobile Node is always identified by its Home Address. While away from its home IP subnet (Home Subnet) a Mobile Node is also associated with a Care-of Address which indicates the Mobile Node's current location. The association of the Mobile Node's Home Address and the Care-of Address is known as Binding. A router in the Home Subnet, known as the Home Agent, maintains a record of the current Binding of the Mobile Node. The Mobile Node can acquire its Care-of Address through conventional IPv6 mechanisms called auto-configuration at the visited (or foreign) IP subnet.

Any node with which a Mobile Node is communicating is referred to as a Correspondent Node. The Correspondent Node could itself be either mobile or stationary.

There are two possible modes for communications between the Mobile Node and the Correspondent Node. The first mode, bidirectional tunnelling to/from the Home Agent, does not require Mobile IPv6 support from the Correspondent Node and is available even if the Mobile Node has not registered its current Binding with the Correspondent Node. The first mode is illustrated in FIG. 1 of the accompanying drawings. IP packets from the Correspondent Node are routed to the Home Agent and then tunnelled to the Mobile Node. Packets to the Correspondent Node are tunnelled from the Mobile Node to the Home Agent ("reverse tunnelled") and then routed normally from the Home Network to the Correspondent Node. In this mode, the Home Agent intercepts any IPv6 packets addressed to the Mobile Node's Home Address and each intercepted packet is tunnelled to the Mobile Node's primary Care-of Address. This tunnelling is performed using IPv6 encapsulation.

The second mode, referred to as 'route optimization', requires the Mobile Node to register its current binding at the Correspondent Node. The second mode is illustrated in FIG. 2 of the accompanying drawings. Packets from the Correspondent Node can be routed directly to the Care-of Address of the Mobile Node. When sending a packet to an IPv6 destination, the Correspondent Node checks its cached bindings for an entry for the packet's destination address. If a cached binding for this destination address is found, the node uses a new type of IPv6 routing header to route the packet to the Mobile Node by way of the Care-of Address indicated in this binding.

In this regard, a routing header may be present as an IPv6 header extension, and indicates that the payload has to be delivered to a destination socket in some way that is different from what would be carried out by standard receiver host processing. Mobile IPv6 defines a new routing header variant, the type 2 routing header, to allow the packet to be routed directly from a Correspondent Node to the Mobile Node's care-of address. Use of the term "routing header" typically refers to use of a type 2 routing header. The Mobile Node's care-of address is inserted into the IPv6 Destination Address field. Once the packet arrives at the care-of address, the Mobile Node extracts the final destination address (equal to its home address) from the routing header, and delivers the packet to the appropriate socket as if the packet were addressed to the extracted address.

The new routing header uses a different type than defined for "regular" IPv6 source routing, enabling firewalls to apply different rules to source routed packets than to Mobile IPv6. This routing header type (type 2) is restricted to carry only one IPv6 address and can only be processed by the final destination and not intermediate routers.

All IPv6 nodes which process this routing header must verify that the address contained within is the node's own home address in order to prevent packets from being forwarded outside the node. The IP address contained in the routing header, since it is the mobile node's home address, must be a unicast routable address.

Furthermore, if the scope of the home address is smaller than the scope of the care-of address, the mobile node must discard the packet.

With route optimization, the Mobile Node registers its current binding at the Correspondent Node using a Binding Update message sent from the Mobile Node to the Correspondent Node (which the Correspondent Node acknowledges with a Binding Update Acknowledgement message). The Binding Update message contains as its destination address the address of the Correspondent Node. The source address of the message is the Care-of Address of the Mobile Node, whilst the home address of the Mobile Node is contained within a home address field of the message header. Route optimisation requires the inclusion of a routing header (a type 2 routing header) in the packet headers, indicating that the packets must be dealt with in a special way.

In order to enhance security of the Optimised Routing process, a "proof-of-address" mechanism may be employed. One such mechanism requires that, prior to issuing a (first) Binding Update message, a roaming Mobile Node send to a Correspondent Node a first message (HoTI) to the Correspondent Node employing route optimisation and a second message (CoTI) not employing route optimisation. The second message travels via the Home Agent whilst the first does not. The Correspondent Node replies to the first message with a first part of a random number generated by the Correspondent Node, and replies to the second message with a second part of the random number. The Mobile Node will only receive both parts of the random number if it has given both a valid Care-of Address and a valid Home Address. When the Binding Update is subsequently sent to the Correspondent Node, the Mobile Node includes both parts of the random number in the message to prove ownership of the Care-of and Home Addresses.

Once implemented, Route Optimisation allows the Mobile Node to send packets directly to the Correspondent Node. The Care-of Address is included as the source address in these "outgoing" packets. This is done by the Mobile IP protocol layer at the Mobile Node, which replaces the home address with the Care-of Address as the source address in outgoing packets. The Home Address is included in a further header field. The Mobile IP protocol layer at the Correspondent Node screens incoming mails by comparing the source addresses of the packets with Care-of Addresses held in its binding cache. If a match is found, the Care-of Address is replaced with the corresponding Home address, in the source address field, before passing the message to higher layers. Transit through the home network is thus avoided.

Considering the reverse direction, packets from the Correspondent Node can be routed directly to the Care-of Address of the Mobile Node. When sending a packet to an IPv6 destination, the Correspondent Node checks its cached bindings for an entry for the packet's destination address. If a cached binding for this destination address is found, the node substitutes the destination address for the corresponding Care-of Address, whilst including the destination address (i.e. the Home address) in a further header field. Upon receipt of a packet at the Mobile Node, the Mobile IP protocol layer replaces the Care-of Address in the destination field with the home address of the Mobile Node. The packet is then passed to higher protocol layers. Again, transit through the home network is avoided.

Routing packets directly to the Mobile Node's Care-of Address with 'route optimization' allows the shortest communications path to be used. It also eliminates congestion at the Mobile Node's Home Agent. In addition, the impact of any possible failure of the Home Agent or networks on the path to or from it is reduced. However, the possibility of 'route optimization' that MIPv6 provides does lead to a terminal centric solution, as the establishment of home address to care-of address bindings in the correspondent node is decided, initiated and executed by the mobile node itself. This does not allow network operators to influence whether traffic is tunnelled home or routed locally. For example, home networks have no influence if a particular piece of traffic is route via them or not. This is true even if the visited network fully co-operates with the home network in this regard. The simple use of a local IP address is also decided by the terminal. If (home) network control of route optimization is requested, the use of local addresses needs to be controlled too.

The design of Mobile IPv6 did not include performing a care-of address (CoA) reachability test each time the mobile node (MN) updates its home agent (HA) with a new CoA. One possible reason for leaving such a test out of the specification is that with MIPv6 the focus is more on the route optimization (RO) mode, which involves performing a return routability (RR) procedure every seven minutes as long as the MN is located in a foreign network (while having ongoing session(s)). However, the RR procedure alone consists of exchanging four signalling messages (namely, HoTI/HoT and CoTI/CoT) between the MN and each CN. The RR procedure is followed by sending a binding update (BU) message to each CN to update it with the new MN's CoA (and probably receiving a binding acknowledgment (BA)). It follows that updating two CNs with the new CoA requires the MN to exchange at least ten mobility signalling messages after having updated its own HA with the new CoA, which in turn requires exchanging a BU/BA messages. In total, 12 signalling messages are needed before resuming the data packets exchange. After that, the MN needs to repeat the RR with each CN every 7 minutes.

While the CoA reachability test is mandatory in the RO mode, it has been neglected when it comes to updating the HA. One reason advanced for this is that, in case of an attack, the HA will get a call (from someone or discover it by itself) and punish the attacker. Another reason could be considered to be avoiding increasing the burden of signalling messages on the MN, which is already burdened with the main task of actually exchanging data packets.

On the other side, performing the same CoA reachability test on the HA side, prior to updating it with the new CoA, requires two additional mobility signalling. However, in order to be efficient, the CoA test must be repeated periodically as is the case with each CN. Otherwise a multi-homed MN can perform a successful CoA reachability test then update its HA with its new CoA then use another interface to launch a network flooding attack against the foreign network. In summary, this means a significant increase of signalling messages on the MN side. In order to avoid such scenario, it has been decided that the MN does not need a CoA reachability test when updating the HA.

In order to cut the number of signalling messages, the enhanced mobile IPv6 RO mode (see J. Arkko, C. Vogt, W. Haddad, "Enhanced Route Optimization for Mobile IPv6", IETF, RFC 4866, May 2007) has been designed and standardized. EMIPv6 relies on the cryptographically generated address (see T. Aura, "Cryptographically Generated Addresses", IETF, RFC 3972, March 2005) to bootstrap a long lifetime bidirectional security association (BSA) between the MN and the CN instead of relying on routing properties to establish a temporary BSA as is the case in MIPv6 protocol. Consequently, EMIPv6 succeeds in substituting the RR with a CGA technique but at the expense of abandoning the protection against network flooding attack. In order to counter such threat without re-introducing the periodic RR, a defence mechanism based on establishing a cryptographic relationship (also know as a 'symbiotic' relationship) between the MN and the access router (AR) in the visited network has been recently introduced in W. Haddad, M. Naslund, "Using 'Symbiotic' Relationship to Repel Network Flooding Attack", IETF, draft-haddad-mipshop-netflood-defense-00, December 2007; this will be referred to herein as the "NFD" protocol (Network Flooding Defence).

The NFD protocol enables the visited network to repel a network flooding attack, which can be launched via using the RO mode. However, it does not provide any protection to the visited network in case the attack is launched via using the bidirectional tunneling (BT) mode where all data packets exchanged between the MN and the CN(s) are tunneled via the MN's HA. Furthermore, as the main goal in EMIPv6 was to cut the number of mobility signalling messages on the MN side as much as possible, it is not appropriate to clone a CoTI/CoT exchange between the MN and the HA prior to sending a BU message. In fact, doing that will make EMIPv6 no different than MIPv6 RO mode in case the MN is exchanging data packets with the CN and is constantly on the move. Note that the situation may become further aggravated when the MN is registering multiple CoAs with its HA.

It is desirable to address the above-mentioned issues concerning the existing approaches.

SUMMARY

According to a first aspect of the present invention there is provided a method for use in a Mobile IP network, comprising determining whether a Mobile Node in a visited network is reachable on a new claimed Care-of Address for the Mobile Node using information relating to a pre-established cryptographic relationship between the Mobile Node and an Access Router of the visited network.

The method may comprise determining through communication between a Home Agent for the Mobile Node in the Mobile Node's home network and the Access Router whether such a pre-established cryptographic relationship exists, the existence of such a pre-established relationship indicating that the Mobile Node is reachable on the claimed Care-of Address.

The method may comprise communicating the Care-of Address in a message from the Home Agent to the Access Router, for use at the Access Router in the determining of whether the Access Router has a pre-established cryptographic relationship with the Mobile Node.

The method may comprise checking whether the Care-of Address is stored at the Access Router as a result of the pre-established relationship.

The method may comprise communicating a link to a certificate for the Access Router in a Binding Update message from the Mobile Node to the Home Agent.

The method may comprise sending a Binding Complete message from the Access Router to the Home Agent, wherein the Binding Complete message comprises the information relating to the pre-established relationship, and wherein the method comprises checking the information at the Home Agent as part of the determining of whether the Access Router has a pre-established cryptographic relationship with the Mobile Node.

The Binding Complete message may be signed by the Access Router, and the method may comprise checking the signature of the Binding Complete message at the Home Agent as part of the determining of whether the Access Router has a pre-established cryptographic relationship with the Mobile Node.

It may be that the Secure Neighbor Discovery, SeND, protocol is deployed in the visited network.

An embodiment of the present invention is also applicable in a case where there are a plurality of new claimed Care-of Addresses for the Mobile Node, with each supposedly being associated with a corresponding pre-established cryptographic relationship between the Mobile Node and the Access Router. In such a case, a reachability test as described above in accordance with the invention may be performed in respect of fewer than all of, such as only one of, the pre-established cryptographic relationships.

If the test against a certain number (e.g. one) of these fails, then the Mobile Node could be assumed to be a rogue node without performing any further tests.

According to a second aspect of the present invention there is provided an apparatus for use as or in a node of a Mobile IP network, comprising means for determining whether a Mobile Node in a visited network is reachable on a new claimed Care-of Address for the Mobile Node using information relating to a pre-established cryptographic relationship between the Mobile Node and an Access Router of the visited network, or means for providing such information to enable such a determination to be made. The node may be the Mobile Node, the Access Router, or a Home Agent for the Mobile Node in the Mobile Node's home network.

The apparatus may comprise means for determining through communication between a Home Agent for the Mobile Node in the Mobile Node's home network and the Access Router whether such a pre-established cryptographic relationship exists, the existence of such a pre-established relationship indicating that the Mobile Node is reachable on the claimed Care-of Address. The node may be the Access Router or the Home Agent.

The apparatus may comprise means for receiving a Binding Complete message from the Access Router, the Binding Complete message comprising the information relating to the pre-established relationship, and further comprising means for checking the information as part of the determining of whether the Access Router has a pre-established cryptographic relationship with the Mobile Node. The node may be the Home Agent.

The Binding Complete message may be signed by the Access Router, and the apparatus may comprise means for checking the signature of the Binding Complete message as part of the determining of whether the Access Router has a pre-established cryptographic relationship with the Mobile Node. The node may be the Home Agent.

The apparatus may comprise means for sending a Binding Complete message to the Home Agent, the Binding Complete message comprising the information relating to the pre-established relationship. The node may be the Access Router.

The apparatus may comprise means for signing the Binding Complete message. The node may be the Access Router.

The apparatus may comprise means for communicating a link to a certificate for the Access Router in a Binding Update message from the Mobile Node to the Home Agent. The node may be the Mobile Node.

According to a third aspect of the present invention, there is provided a program for controlling an apparatus to perform a method according to the first aspect of the present invention.

The program may be carried on a carrier medium, where the carrier medium may be a storage medium or a transmission medium.

According to a fourth aspect of the present invention, there is provided a storage medium containing a program according to the third aspect of the present invention.

An embodiment of the present invention is applicable to the enhanced Mobile IPv6 route optimization mode. It addresses the lack of any care-of address reachability test on the home agent side, which was justified by poor non-technical arguments and to avoid imposing additional mobility signalling messages on the mobile node itself. It enables the home agent to test the reachability of the claimed care-of address in a new way, which addresses implicitly the multi-homing scenario and enables the foreign network to repel a flooding attack but without involving the mobile node in any signalling message exchange.

An embodiment of the present invention aims to improve Mobile IPv6 protocol security by enabling an enhanced care-of address reachability test for the home agent. The main goals are to discourage a rogue mobile node from misleading its home agent to flood a targeted foreign network and to empower the latter to thwart this type of attack if launched at a later stage.

As mentioned above, the two different modes in the Mobile IPv6 protocol for handling data packet exchange when the mobile node (MN) is located in a foreign network, bidirectional tunneling (BT) and route optimization (RO), have two commonalities. The first one is the mechanism used to update the HA after each IP handoff and requires the MN to send a binding update (BU) message to its HA immediately after configuring a care-of address (CoA). A second commonality is the HA's reaction upon receiving a valid BU message and can be described as a blind trust in the MN claim(s) regarding its new CoA(s). The common consequence is that the HA will always tunnel data packets to the MN's new location without conducting any reachability test on the new claimed CoA.

An embodiment of the present invention aims to avoid the potential consequences of a lack of CoA reachability test on the HA side. For this purpose, an enhanced and seamless CoA test is introduced which makes launching a network flooding attack complicated enough to discourage a rogue MN from misleading its HA to flood a particular target. In addition, it empowers the targeted network to thwart such attack if launched at a later stage.

An embodiment of the present invention introduces an enhanced and seamless CoA reachability test which has been designed to address uncertainties surrounding a potential threat in MIPv6 protocol. Consequently, the main goal is to improve MIPv6 overall security in a way which does not require a periodic exchange of signalling messages and does not involve the MN in the exchange.

The suggested reachability test does not directly involve the MN and does not affect the HA's basic treatment of the BU message (as described in RFC 3775) nor does it increase the overall latency. An embodiment of the present invention allows the visited network to protect itself regardless of whether the MN 10 behaves properly in performing the CoA reachability test.

DETAILED DESCRIPTION

Figure 3A:
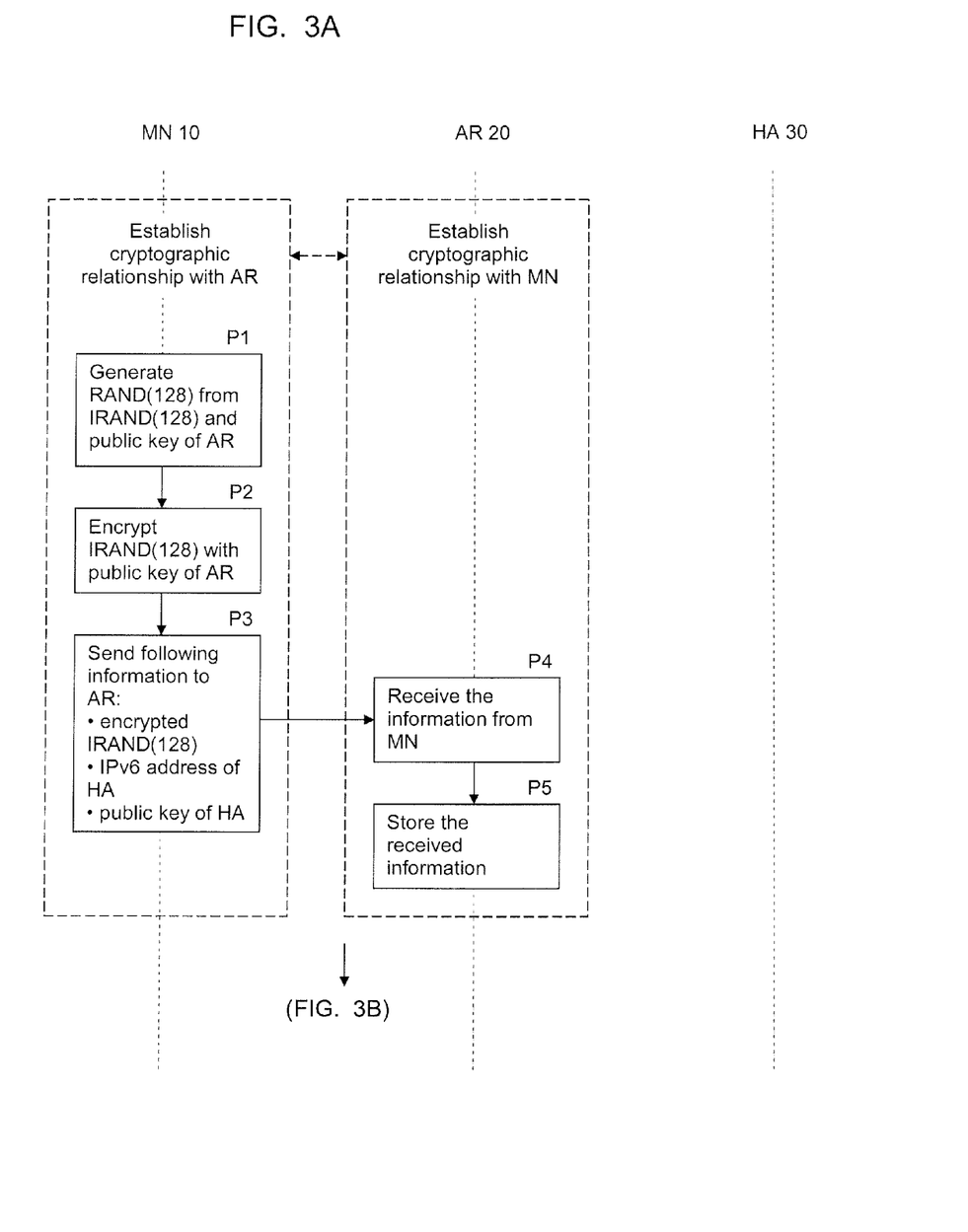
FIGS. 3A to 3C contain a schematic flowchart illustrating steps performed in an embodiment of the present invention.
Figure 3B:
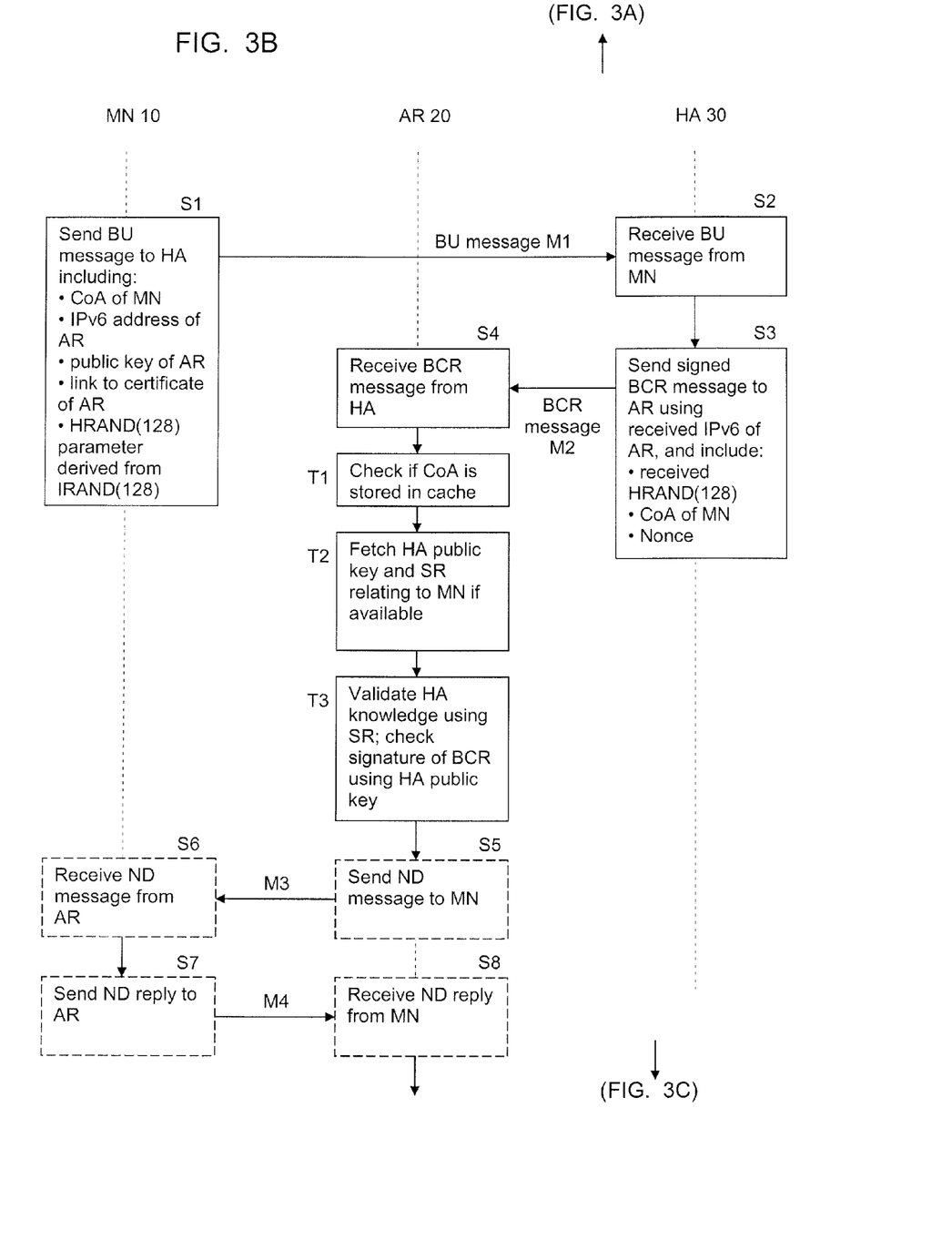
Figure 3C:
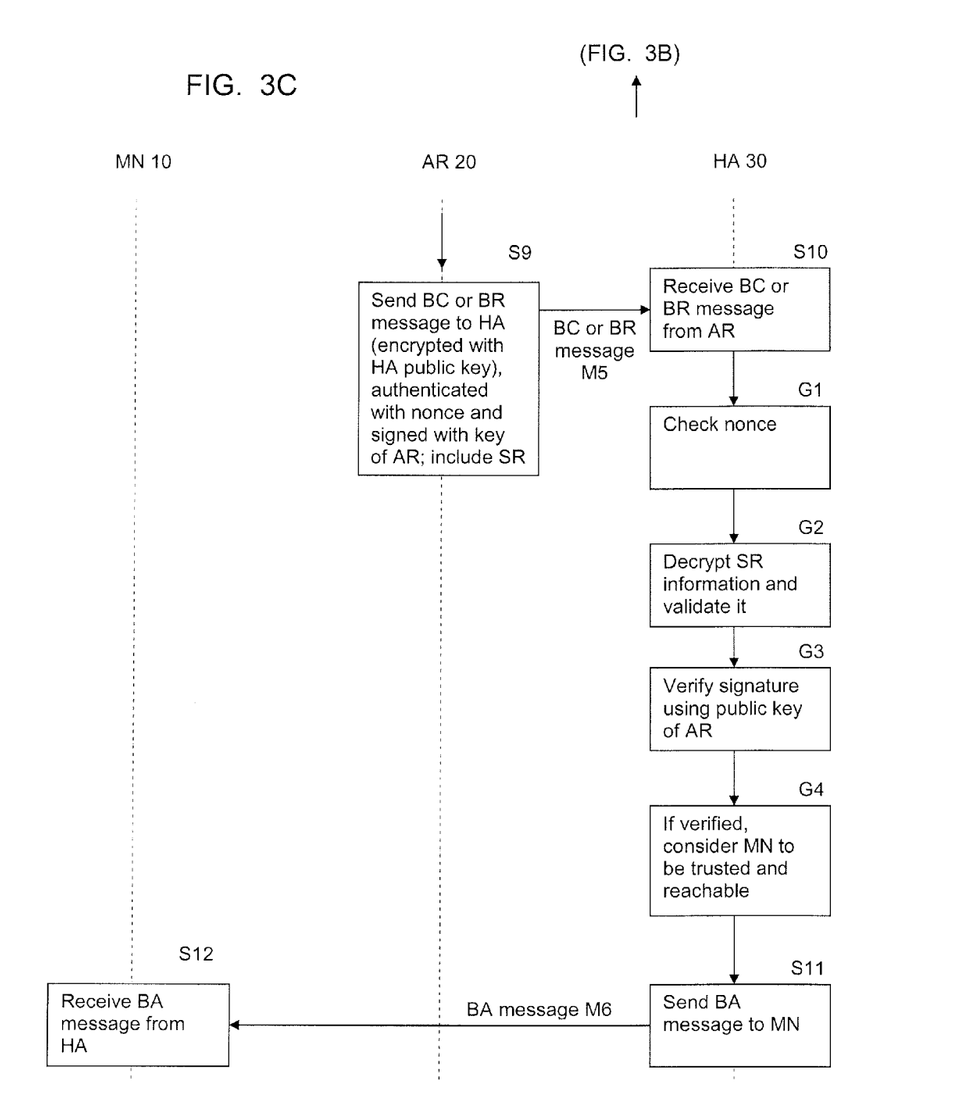
Figure 4:
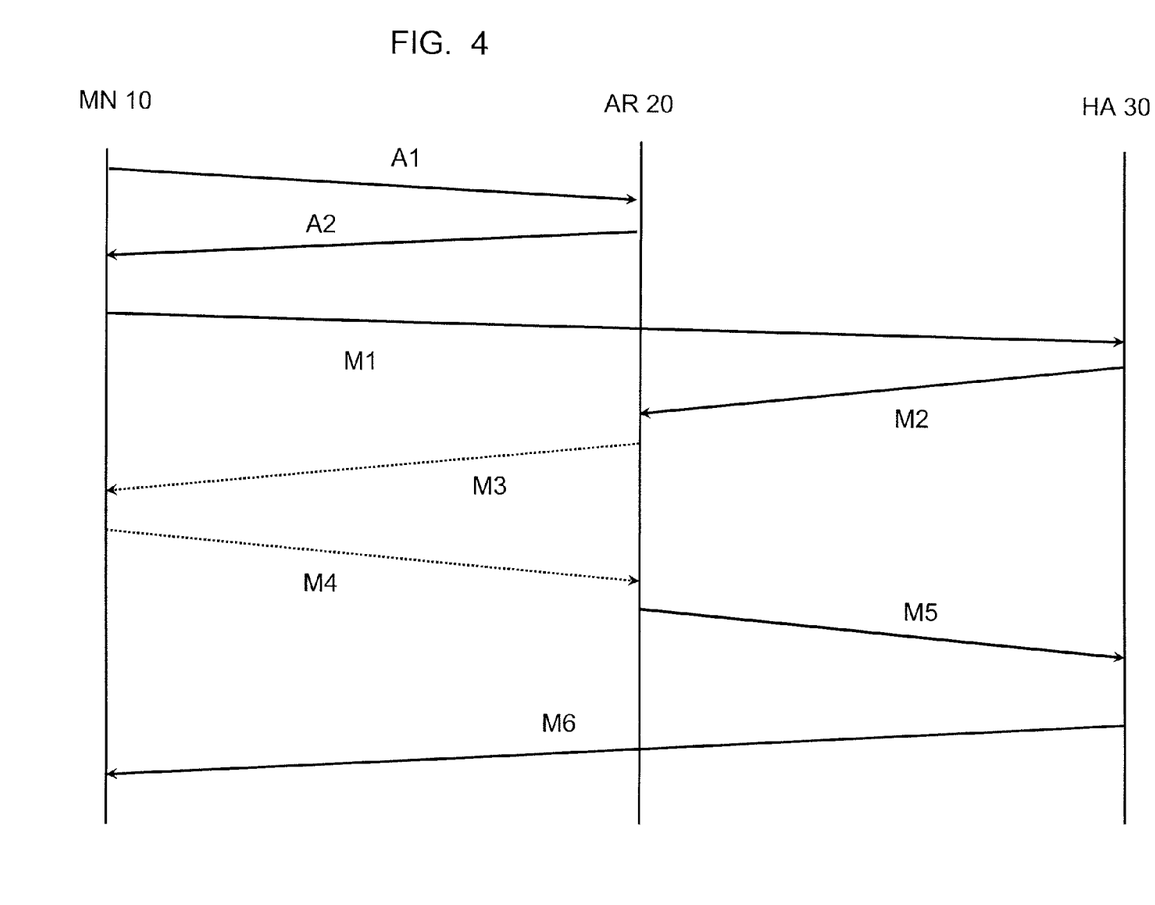
FIG. 4 is a message exchange diagram providing an overview of the messages exchanged during the steps of FIGS. 3A to 3C.
Figure 5:
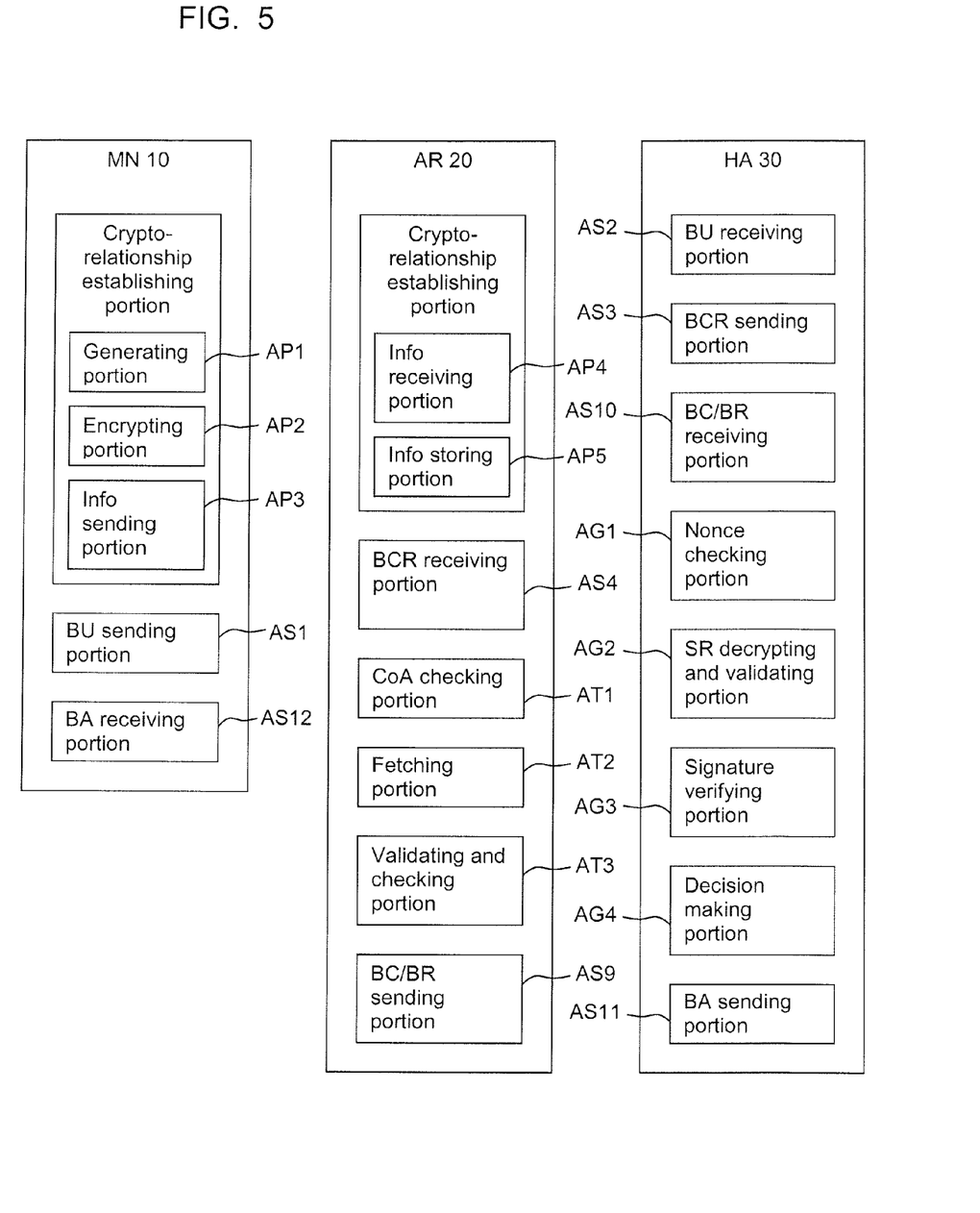
FIG. 5 is a schematic illustration of parts of an embodiment of the present invention for performing the method of FIGS. 3A to 3C.

An embodiment of the present invention will now be described with reference to FIGS. 3A, 3B, 3C, 4 and 5. FIGS. 3A to 3C provide a schematic flowchart showing the steps performed by a MN 10, an AR 20 and a HA 30; in general, the steps of FIG. 3B follow on from those of FIG. 3A, and the steps of FIG. 3C follow on from those of FIG. 3B. FIG. 4 provides an overview of the signalling messages exchanged between the MN 10, AR 20 and HA 30. FIG. 5 is a schematic block diagram showing parts of the MN 10, AR 20 and HA 30 for performing the method of FIGS. 3A to 3C.

In order to address the issues and uncertainties described earlier, a CoA reachability test is introduced in an embodiment of the present invention which is triggered by the HA 30 associated with the MN 10 receiving a valid BU message from the MN 10.

Before that, however, the MN 10 is involved in establishing a cryptographic or symbiotic relationship (SR) with the AR 20, as illustrated in FIG. 3A, for example as in the NFD protocol mentioned above (see also W. Haddad, and M. Naslund, "On Secure Neighbor Discovery Proxying Using 'Symbiotic' Relationship", Internet Draft, draft-haddad-cgaext-symbiotic-sendproxy-00.txt, January 2008).

Establishing a SR with the AR 20 involves the MN 10 incorporating special parameters in order to generate the 128-bit random parameter, RAND(128), to be used to configure its CGA address. As described in the "On Secure Neighbor Discovery Proxying Using 'Symbiotic' Relationship" reference mentioned above, this means that the RAND(128), used together with the MN 10's public key and other parameters to generate the 64-bit interface identifier (IID) should, in turn, be generated from the AR 20's public key and another random 128-bit parameter, IRAND(128); this is done in step P1 of FIG. 3A by generating portion AP1 of the MN 10. The parameter IRAND(128) can be considered as being an inner RAND (128), with RAND(128) being generated from IRAND(128) for example by RAND(128)=First(128, Hash(IRAND(128) |AR_Public_Key).

In step P2, an encrypting portion AP2 of the MN 10 then encrypts the IRAND(128) with the AR 20's public key and in step P3 an information sending portion AP3 of the MN 10 sends it to the AR 20 in an NDP (Neighbour Discovery Protocol) message signed with the MN 10's CGA private key. In addition, the MN 10 also includes two other parameters in the sending step P3 that are also required by the AR 20: the HA 30's IPv6 address and the HA 30's public key; this information can be sent in new options carried in a message used during a NDP exchange, e.g. the router solicitation (Rt-Sol) message. Following receipt at an information receiving portion AP4 of the AR 20 in step P4, these two parameters are stored by the AR 20 in step P5 in an information storage portion AP5 together with the MN 10's SR (basically IRAND (128)) and the HA 30's public key, as well as the CoA of the MN 10. The IRAND(128) can be considered to be an authentication token or shared secret, to be used later in an embodiment of the present invention.

For the purpose of an embodiment of the present invention, the MN 10 is denied access in the visited network, as in the NFD protocol described above, until it establishes such a cryptographic relationship SR with the AR 20. This cryptographic relationship enables the MN 10 to provide the HA 30 with information in order to enable the HA 30 to securely contact the AR 20 and to determine whether the MN 10 is reachable on the claimed CoA, as is explained below.

Once the cryptographic relationship has been established between the MN 10 and the AR 20, a secure CoA reachability test is triggered when the MN 10 sends, in step S1 of FIG. 3B, a BU message M1 to the HA 30 to update it with its new CoA, using BU sending portion AS1.

In the BU message M1, the MN 10 discloses to its HA 30 information relating to the cryptographic relationship. The MN 10 includes in the BU message M1 the AR 20's IPv6 address, the AR 20's public key and a link to the AR 20's certificate, i.e. the same as the one obtained by the MN 10 when attaching to the AR 20 link. In addition, the MN 10 includes, in an encrypted form, a parameter derived from hashing IRAND(128), referred to here as HRAND(128); this may be a 64 bit parameter, or may greater in length, for example at least 96 bits.

The information relating to the cryptographic relationship (128-bit random parameter) is encrypted in the BU message M1 with the key shared with the HA 30 from running IKEv2 (see C. Kaufman, "Internet Key Exchange (IKEv2) Protocol", IETF, RFC 4306, December 2005), i.e. when bootstrapping the IKE SA between the two nodes. The two parameters, i.e. the AR's IPv6 address and the HRAND(128), are sent in two new options carried by the BU message M1.

The BU message M1 is received by the HA 30 in step S2. This sets off an exchange of new signalling messages between the HA 30 and the AR 20 of the MN 10, which will now be explained in more detail.

Following receipt in step S2 of the BU message M1 carrying the new parameters (by a BU receiving portion AS2 of the HA 30), in step S3 a BCR sending portion AS3 of the HA 30 sends a new message called a "Binding Complete Request (BCR)" message M2 to the AR 20 using the IPv6 address sent in the BU message. For this purpose, the HA 30 authenticates the BCR message M2 with the HRAND(128) sent by the MN 10 in the BU message M1. The BCR message M2 carries the MN 10's CoA as sent in the BU message M1, and is authenticated with the cryptographic relationship established between the MN 10 and the AR 20. The BCR message M2 contains a nonce which is to be subsequently returned in the BC/BR message (see step S9 below), and discloses what it knows about the SR established between the MN 10 and its AR 20, i.e. HRAND(128). In addition, the HA 30 signs the BCR message M2. The nonce is a random number generated by the HA 30 (by any means), which is then returned in the BC/BR message (see below); it serves to tell the HA 30 that the message has been sent by a node which is not anywhere in the Internet, so it narrows the possibility of an attack to just the nodes located on-path between the HA 30 and the AR 20.

It is to be noted that the BCR message M2 does not need explicitly to contain HRAND(128) in a new option. The HA 30 can authenticate the BCR message M2 with HRAND (128), but the HRAND does not need to be sent in the message itself. The nonce, which is separate, is a way to protect against flooding the HA 30 with fake BC messages, and hence the reason why the AR 20 copies the nonce and inserts it in the BC message (see below). The nonce is different to the HRAND (128). The nonce can be a random number generated by the HA 30 and is returned by the AR 20 in the BC/BR message.

Upon receiving the BCR message M2 in step S4 (at a BCR receiving portion AS4 of the AR 20), the AR 20 determines whether or not it believes that the MN 10 is still attached to its link.

A CoA checking portion AT1 of the AR 20 can start by checking in step T1 if the queried CoA is stored in its cache memory. Then in step T2 a fetching portion AT2 of the AR 20 fetches the MN 10's corresponding SR (i.e. IRAND(128)) and HA 30's public key. In step T3 the former is used by a validating and checking portion AT3 of the AR 20 to validate the HA knowledge, and the latter to check the signature of the BCR message M2. Validation of the HA knowledge means to check if the HA 30 has really received HRAND(128); the validation is done by checking the authentication carried in the BCR message M2—if the authentication is done with HRAND(128) as being the key, then the HA 30 knows it, so it is valid. If the signature is valid, then the AR 20 should immediately reply by sending a "Binding Confirm (BC)" message (see step S9 below) in which it inserts its own SR, the nonce and signs the message with its private key. Note that the AR 20 should encrypt the SR with the HA 30's public key.

The AR 20 may perform a procedure to re-check the attachment of the MN 10, e.g., using a neighbour discovery (ND) message (see T. Narten, E. Nordmark, W. Simpson, H. Soliman, "Neighbor Discovery for IP version 6 (IPv6)", IETF, RFC 4861, September 2007).

Using a neighbour discovery procedure, the AR 20 sends in step S5 a ND message M3 towards the CoA of the MN 10 as received in step S4 in the BCR message M2. This message M3 is received by the MN 10 in step S6 (assuming the message M3 actually arrives at the MN 10), and in step S7 a ND reply message M4 is sent back to the AR 20 and received in step S8.

This procedure (involving messages M3 and M4) is optional. For example, the AR 20 does not need to check if the MN 10 is on-link or not if it finds that there is an SR concerning this node stored in its cache memory. In fact, the MN 10 may be out of reach for some time (for example due to bad coverage) but it does not matter since in case of an attack, the AR 20 can use the SR only to alert the HA 30.

In the case where the AR 20 believes that the MN 10 is still attached to its link, a BC/BR sending portion AS9 of the AR 20 sends in step S9 a "Binding Complete (BC)" message M5, which is authenticated with the same RAND(128).

Otherwise, the BC/BR sending portion AS9 of the AR 20 instead sends in step S9 an authenticated "Binding Reject (BR)" message M5 to the HA 30.

The BC/BR message M5 is therefore sent by the AR 20 to the HA 30 of the MN 10 as a response to the BCR message M2. The BC message M5 is authenticated with the cryptographic relationship or SR (essentially, (RAND( )) and is signed with the AR 20's private key (i.e. that which has been used to establish the cryptographic relationship). The BR message M5 is authenticated whenever possible (i.e. if the MN 10 has established the cryptographic relationship then left the network). Otherwise, the AR 20 signs the BR message M5 (which carries the nonce sent in the BCR message M2) with its private key (note that the AR 20 should have a CGA address built from the public key pair).

The BC or BR message M5 is received by a BC/BR receiving portion AS10 of the HA 30 in step S10. When the HA 30 receives a BC message from the AR 20, a nonce checking portion AG1 of the HA 30 starts by checking the nonce (step G1), then a SR decrypting portion AG2 of the HA 30 decrypts the SR and validates it (step G2). Then a signature verifying portion AG3 of the HA 30 verifies the signature by using the AR 20's public key already stored in the MN 10's corresponding entry (step G3).

The AR 20's signature allows the HA 30 to validate the certificate provided by the MN 10. Hence, if the signature is valid, then in step G4 a decision making portion AG4 of the HA 30 can consider with enough confidence that the MN 10 has indeed visited the AR 20 and exchanged NDP messages with it and an SR has been accepted. Furthermore, it also allows the HA 30 to validate the AR 20's certificate sent by the MN 10, which also serves as an indication to the HA 30 that the AR 20 is now empowered to repel any malicious behaviour that can emanate from the MN 10, e.g. launching a flooding attack at a later stage. It follows that the CoA reachability test does not need to be repeated periodically.

After completing a successful reachability test, i.e., performed in parallel with the DAD procedure in the home network, the HA 30 starts tunnelling data packets to the MN 10's new CoA. As already mentioned, the presence of the SR between the MN 10 and its AR 20 will prevent the MN 10 from moving away at some point, and launching a flooding attack by keeping sending acknowledgment messages to the CN, e.g. using another interface. In fact, in case such an attack is launched, the AR 20 will quickly detect the MN 10's absence on the link and securely request the HA 30 to halt the data packets flow to the MN 10's CoA. Note that, in this context, making a secure request means that the AR 20 must re-send the SR established by the MN 10 without encryption and must sign the message with its private key.

In step S11 a BA message M6 is sent by a BA sending portion AS11 of the HA 30 to the MN 10, in response to the BU message received in step S2, which is received by a BA receiving portion AS12 of the MN 10 in step S12. This message M6 can be sent immediately after the BU message M1 or in parallel with sending the BCR message M2 (or it could be piggybacked with the BCR message M2). The BA message is authenticated.

FIG. 4 provides an overview of the signalling messages exchanged between the MN 10, AR 20 and HA 30 in the method illustrated in FIGS. 3A to 3C. In addition, FIG. 4 shows ND message A1 and A2 sent prior to message M1. Message A1 is sent by the MN 10 to the AR 20, in which it includes the SR and HA parameters. Message A2 is the reply the MN 10 gets from the AR 20. These two messages can be a Router Solicitation sent by the MN 10 and a Router Advertisement sent by the AR 20.

It may be considered why the signalling message exchange between the HA 30 and the AR 20 is needed if the MN 10 is required to establish a cryptographic relationship with the AR 20. In fact, limiting the protection to establishing a cryptographic relationship only will indeed provide a significant improvement as it makes the flooding attack more difficult to launch, but this is not enough to eliminate it entirely. The remaining vulnerability in this case emanates from the potential ability of the MN 10 to use an interface where no ingress filtering is provided and update the HA 30 with a CoA configured with the targeted prefix. In such a scenario, the AR 20 located in the targeted network will be able to detect the attack and drop the incoming packets but it will not be able to stop the flooding as it has no mechanism to alert the HA 30 about the fake CoA.

A malicious MN may try to bypass the AR by sending another IPv6 address in the BU message, which is not configured on the AR. This may be the case, for example, when using more than one interface to perform the update. In such a case, the HA will always believe that it can check the MN's reachability by sending a BCR message to the IPv6 address sent in the BU message M1. However, when the AR receives the BCR message, it needs to use ND to learn the MAC address associated with the IP address.

In an embodiment of the present invention, prior to discovering the MAC address, the AR first checks if the IPv6 address is stored in its cache memory, which also means checking whether or not a cryptographic relationship has been established. If not, the AR should drop the incoming BCR message, and this prevents the malicious MN performing the reachability test. In this scenario, the only consequence is that the HA will reject the binding and no data packets will be tunnelled to the targeted network, so the attack will be foiled by the HA.

However, in the case where the IPv6 destination address sent in the BCR message has a cryptographic relationship with the AR then the latter will forward the BCR message to its destination and it is up to the MN as to whether or not to respond to the HA. It follows immediately that the MN has no interest in performing the reachability test exchange by itself as it won't bring it any benefit except additional signalling message and delay the whole procedure.

Although it might be thought that performing a mechanism embodying the present invention will increase the IP handoff latency, as it is necessary to update the HA 30 prior to updating the CN 40 (when the RO mode is used), in fact the CoA reachability test according to an embodiment of the present invention can be performed in parallel with exchanging data packets on the HA 30 to MN 10 path (for example, if the BT mode is enabled) or in parallel with updating the CN 40 (for example, when the RO mode is used and no data packets are sent via the HA 30). Moreover, when IP mobility is in use, a mechanism for handling fast mobility becomes unavoidable in order to guarantee an acceptable latency. Otherwise, it is well known that the latency induced by MIPv6/EMIPv6 protocols remains largely unacceptable to offer time sensitive applications.

It is possible that the MN 10 configures more than one CoA on the same foreign link and sends all of them to the HA 30 in one BU message. In such a scenario, the MN 10 would establish an SR per CoA, but the HA 30 would only need to check one particular CoA with the AR 20; if there is an attack, the AR 20 can use the particular CoA to alert the HA 30 that the MN 10 is an attacker and thus all its CoAs should be rejected.

As mentioned above, an embodiment of the present invention aims to improve MIPv6 overall security without increasing the signalling message load on the MN. For this purpose, the key exchange in the proposed mechanism is performed between the MN's HA and the new AR. It should be noted that repeating the same CoA reachability test as the one which is periodically performed between the MN and its CN(s), i.e. as part of the return routability procedure, will result in a significant increase in the amount of signalling messages on the MN side as it needs also to be repeated periodically in order to be efficient.

The resulting improvement from the proposed mechanism should also benefit other protocols which have been designed around MIPv6, e.g. network mobility protocol (described in V. Devarapalli, R. Wakikawa, A. Petrescu, and P. Thubert, "Network Mobility (NEMO) Basic Support Protocol", RFC 3963, January 2005). Another goal is to strengthen the network's ability to thwart network flooding attack launched via the MN's HA by improving the network protective means, in the same way as has already been suggested in the network flooding defence mechanism (as in NFD) for the enhanced route optimization (described in the "Enhanced Route Optimization for Mobile IPv6" detailed above).

Another implicit goal is to provide yet another strong incentive to deploy the secure neighbor (SeND) discovery protocol (described in J. Arkko, J. Kempf, B. Sommerfield, B. Zill, and P. Nikander, "Secure Neighbor Discovery (SeND)", RFC 3971, March 2005), as the proposed mechanism assumes that SeND is deployed. This means that the MN is CGA enabled and is able to exploit all protective features provided by SeND on the link.

As mentioned earlier, the design of the suggested CoA reachability test should avoid increasing the latency. For this purpose, it is recommended that the HA triggers the CoA reachability test immediately after launching the DAD procedure for the MN's IPv6 home address, i.e. following the receipt of a valid BU message.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A method, performed by a Home Agent for a Mobile Node operative in a Mobile IP network, of determining whether the Mobile Node is reachable in a visited network using a Care-of Address provided by the Mobile Node, the method comprising:
receiving, from the Mobile Node, a Care-of Address, identification of an Access Router of the visited network, and information relating to a pre-established cryptographic relationship between the Mobile Node and the Access Router;
cryptographically verifying, with the Access Router of the visited network, the pre-established cryptographic relationship between the Mobile Node and the Access Router; and
thereafter, forwarding data packets intended for the Mobile Node to the Care-of Address, without again verifying the reachability of the Care-of Address.

2. The method of claim 1 further comprising:
receiving from the Access Router a notice that the Mobile Node has launched a flooding attack in the visited network; and
ceasing forwarding data packets intended for the Mobile Node to the Care-of Address in response to the notice.

3. The method of claim 2, wherein receiving a Care-of Address from the Mobile Node comprises receiving a Binding Update message from the Mobile Node, the Binding Update message including the Care-of Address, a network address of the Access Router, and a public cryptographic key of the Access Router.

4. The method of claim 3, wherein the Binding Update message from the Mobile Node further includes a link to a cryptographic certificate associated with the Access Router, and a second cryptographic parameter HRAND derived from a first cryptographic parameter IRAND used to establish a cryptographic relationship between the Mobile Node and the Access Router.

5. The method of claim 4, wherein cryptographically verifying the pre-established cryptographic relationship between the Mobile Node and the Access Router comprises sending to the Access Router, at the network address received from the Mobile Node, a Binding Complete Request message including a random number (nonce) different from the HRAND.

6. The method of claim 5 wherein the Binding Complete Request message further includes the second cryptographic parameter HRAND received from the Mobile Node.

7. The method of claim 5, further comprising:
cryptographically signing the Binding Complete Request using the second cryptographic parameter HRAND received from the Mobile Node prior to sending the Binding Complete Request to the Access Router.

8. The method of claim 5, further comprising:
receiving from the Access Router of the visited network, a Binding Complete message including the nonce and information relating to the pre-established cryptographic relationship between the Mobile Node and the Access Router.

9. The method of claim 8, wherein the Binding Complete message is signed using a private key associated with the Access Router, and encrypted using a public key associated with the Home Agent.

10. The method of claim 9, further comprising:
decrypting the Binding Complete message;
verifying the nonce;
verifying the information relating to the pre-established cryptographic relationship between the Mobile Node and the Access Router;
verifying the signature of the Access Router using a public key associated with the Access Router;
sending a Binding Accept message to the Mobile Node indicating acceptance of the Care-of Address; and
thereafter, forwarding data packets intended for the Mobile Node to the Care-of Address, without again verifying the reachability of the Care-of Address.

11. The method of claim 10, further comprising:
receiving from the Access Router a secure request for the Home Agent to cease sending data packets to the Care-of Address of the Mobile Node, wherein the secure request includes information relating to the pre-established cryptographic relationship between the Mobile Node and the Access Router, and is signed by the Access Router using a private key associated with the Access Router;
verifying the information relating to the pre-established cryptographic relationship between the Mobile Node and the Access Router;
verifying the signature of the Access Router using a public key associated with the Access Router; and
ceasing the forwarding data of packets intended for the Mobile Node to the Care-of Address.

12. A method, performed by an Access Router of a network visited by a Mobile Node operative in a Mobile IP network, of preventing network flooding attacks by the Mobile Node, the method comprising:
establishing a cryptographic relationship between the Mobile Node and the Access Router; and
cryptographically verifying, to a Home Agent for the Mobile Node, that the Access Router has established a cryptographic relationship between the Mobile Node and the Access Router.

13. The method of claim 12, further comprising:
detecting that the Mobile Node has registered a second Care-of Address with the Home Agent, and is flooding the network with data packets to the second Care-of Address;
in response to the detection, dropping the data packets sent by the Mobile Node; and
sending a secure request to the Home Agent to cease forwarding data packets to the second Care-of Address.

14. The method of claim 13, wherein the secure request includes information relating to the pre-established cryptographic relationship between the Mobile Node and the Access Router, and is signed by the Access Router using a private key associated with the Access Router.

15. The method of claim 12, wherein establishing a cryptographic relationship between the Mobile Node and the Access Router comprises establishing a cryptographic relationship using a Network Flooding Defense (NFD) protocol.

16. The method of claim 12, wherein establishing a cryptographic relationship between the Mobile Node and the Access Router comprises:
receiving from the Mobile Node a Neighbor Discovery Protocol (NDP) message signed using a private key of the Mobile Node, the NDP message including a Care-of Address of the Mobile Node in the visited network, a first cryptographic parameter IRAND encrypted using a public key associated with the Access Router, a network address of the Home Agent of the Mobile Node, and a public key associated with the Home Agent;
decrypting the first cryptographic parameter IRAND using a private key associated with the Access Router; and
storing the Care-of Address, the network address of the Home Agent of the Mobile Node, the public key associated with the Home Agent, and the first cryptographic parameter IRAND.

17. The method of claim 16, wherein verifying to the Home Agent that the Access Router has established a cryptographic relationship between the Mobile Node and the Access Router comprises:
receiving from the Home Agent a Binding Complete Request (BCR) message including the Care-of Address the Home Agent received from the Mobile Node, and a random number (nonce), the BCR message being cryptographically signed using a private key associated with the Home Agent.

18. The method of claim 17, wherein the Binding Complete Request message includes a second cryptographic parameter HRAND received by the Home Agent from the Mobile Node, wherein the second cryptographic parameter HRAND was generated using the first cryptographic parameter IRAND.

19. The method of claim 17 wherein the Binding Complete Request message was cryptographically signed by the Home Agent using a second cryptographic parameter HRAND received by the Home Agent from the Mobile Node, wherein the second cryptographic parameter HRAND was generated using the first cryptographic parameter IRAND.

20. The method of claim 17, further comprising:
verifying that the Care-of Address received from the Home Agent is stored at the Access Router;
retrieving a public key associated with the Home Agent;
cryptographically verifying the signed BCR message received from the Home Agent;
retrieving the first cryptographic parameter IRAND received from the Mobile Node; and
cryptographically verifying a second cryptographic parameter HRAND received from the Home Agent using the first cryptographic parameter IRAND received from the Mobile Node.

21. The method of claim 20, further comprising:
sending to the Home Agent a Binding Complete (BC) message including the nonce received from the Home Agent, the BC message being cryptographically signed using a private key associated with the Home Agent.

22. The method of claim 21, further comprising:
encrypting the first cryptographic parameter IRAND using a public key associated with the Home Agent; and
wherein the BC message additionally includes the encrypted first cryptographic parameter IRAND.

23. The method of claim 21 further comprising, prior to sending the BC message:
verifying the attachment of the Mobile Node to the visited network by sending a Neighbor Discovery (ND) message to the Care-of Address of the Mobile Node; and
receiving a ND reply message from the Mobile Node.

24. A network node operative as a Home Agent in a Mobile IP network, the node comprising:
a receiver operative to receive a Binding Update message from a Mobile Node providing a Care-of Address for use by the Mobile Node in a visited network, an identification of an Access Router of the visited network, and information relating to a pre-established cryptographic relationship between the Mobile Node and the Access Router;
a transmitter operative to transmit at least a cryptographically signed Binding Compete Request message to the Access Router to verify the pre-established cryptographic relationship;
wherein the receiver is further operative to receive from the Access Router a signed Binding Complete message verifying the pre-established cryptographic relationship; and
a controller operative to control the receiver and the transmitter, and after verifying the pre-established cryptographic relationship, operative to forward data packets intended for the Mobile Node to the Care-of Address.

25. The network node of claim 24 wherein:

the receiver is further operative to receive from the Access Router a notice that the Mobile Node has launched a flooding attack in the visited network; and the controller is operative to cease forwarding data packets intended for the Mobile Node to the Care-of Address in response to the notice.

26. A network node operative as an Access Router in a Mobile IP network visited by a Mobile Node, the node comprising:

- a receiver operative to receive one or more Network Flooding Defense (NFD) protocol messages from the Mobile Node;
- a transmitter operative to transmit one or more NFD protocol messages to the Mobile Node;
- wherein the NFD message exchange is operative to establish cryptographic relationship between the Access Router and the Mobile Node; and
- a controller operative to control the receiver and transmitter;

wherein the receiver is further operative to receive from a Home Agent of the Mobile Node in the home network of the Mobile Node, a cryptographically signed Binding Compete Request message seeking to verify the pre-established cryptographic relationship between the Access Router and the Mobile Node; and wherein the transmitter is further operative to transmit to the Home Agent a signed Binding Complete message verifying the pre-established cryptographic relationship.

27. The network node of claim 26 wherein:

the controller is further operative to detect a flooding attack by the Mobile Node, and to drop data packets received from the Mobile Node in response to the detection; and wherein the transmitter is further operative to transmit to the Home Agent a notice of the flooding attack.

* * * * *

UNITED STATES PATENT AND TRADEMARK OFFICE
CERTIFICATE OF CORRECTION

PATENT NO.        : 8,413,243 B2
APPLICATION NO.   : 12/866641
DATED             : April 2, 2013
INVENTOR(S)       : Haddad It is certified that error appears in the above-identified patent and that said Letters Patent is hereby corrected as shown below:

In the Specification

In Column 11, Line 21, delete "(RAND( ))" and insert -- IRAND( )) --, therefor.

Signed and Sealed this
Fifteenth Day of October, 2013

Teresa Stanek Rea
*Deputy Director of the United States Patent and Trademark Office*